United States Patent
Kondo et al.

(10) Patent No.: US 8,377,552 B2
(45) Date of Patent: Feb. 19, 2013

(54) SUPPORT, GLASS SUBSTRATE LAMINATE, SUPPORT-EQUIPPED DISPLAY DEVICE PANEL, AND METHOD FOR MANUFACTURING DISPLAY DEVICE PANEL

(75) Inventors: Satoshi Kondo, Tokyo (JP); Daisuke Uchida, Tokyo (JP); Eiji Nagahara, Osaka (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/404,551

(22) Filed: Feb. 24, 2012

(65) Prior Publication Data

US 2012/0156480 A1 Jun. 21, 2012

Related U.S. Application Data

(63) Continuation of application No. PCT/JP2010/064218, filed on Aug. 24, 2010.

(30) Foreign Application Priority Data

Aug. 28, 2009 (JP) .................. 2009-198761

(51) Int. Cl.
 *B32B 7/06* (2006.01)
 *B32B 17/10* (2006.01)
 *B05D 5/00* (2006.01)
 *G02F 1/1333* (2006.01)

(52) U.S. Cl. ......... 428/337; 156/99; 156/329; 427/387; 427/389.7; 428/332; 428/429; 428/450; 428/451

(58) Field of Classification Search ............ 427/387, 427/389.7; 428/332, 337, 429, 450, 451; 156/99, 329
See application file for complete search history.

(56) References Cited

U.S. PATENT DOCUMENTS

2009/0321005 A1* 12/2009 Higuchi et al. ............... 156/249

FOREIGN PATENT DOCUMENTS

| JP | 09-268261 | 10/1997 |
| JP | 2004-217850 | 8/2004 |
| JP | 2006-241220 | 9/2006 |
| WO | WO-2007/018028 A1 | 2/2007 |

OTHER PUBLICATIONS

International Search Report in PCT/JP2010/064218 dated Oct. 12, 2010.

\* cited by examiner

*Primary Examiner* — D. S. Nakarani
(74) *Attorney, Agent, or Firm* — Foley & Lardner LLP

(57) ABSTRACT

The present invention relates to a support including a supporting substrate and a cured silicone resin layer having a peelable surface and being disposed on one surface of the supporting substrate, for laminating a glass substrate on a surface of the cured silicone resin layer, in which a cured silicone resin of the cured silicone resin layer is a cured material of a curable silicone resin composition containing the specific linear organopolysiloxane (a) and the specific linear organopolysiloxane (b), and the cured silicone resin layer is a cured silicone resin layer formed by curing the curable silicone resin composition on a surface of the supporting substrate.

15 Claims, 1 Drawing Sheet

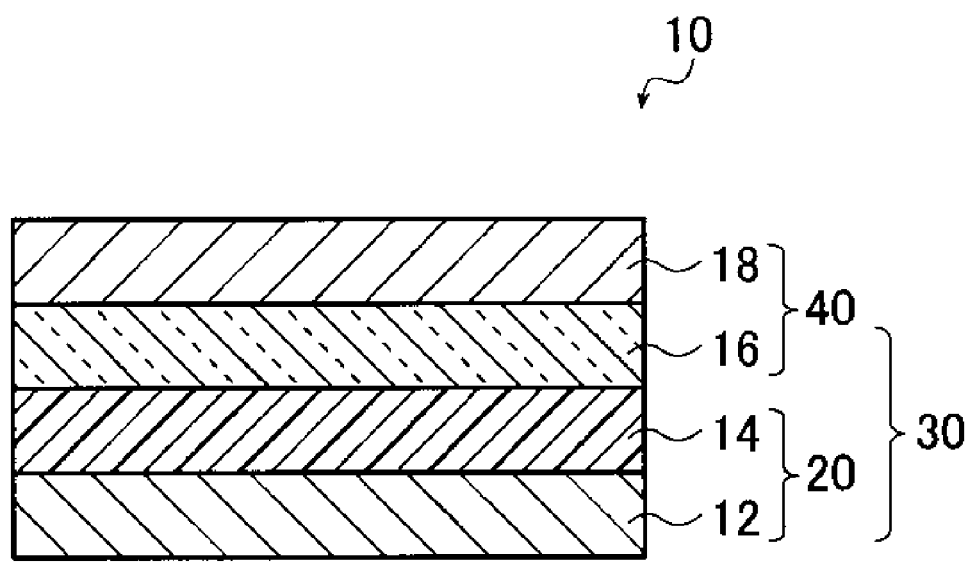

SUPPORT, GLASS SUBSTRATE LAMINATE, SUPPORT-EQUIPPED DISPLAY DEVICE PANEL, AND METHOD FOR MANUFACTURING DISPLAY DEVICE PANEL

TECHNICAL FIELD

The present invention relates to a support which supports a glass substrate used in liquid crystal displays, organic EL displays and the like; a method for producing the support; a method of producing a glass substrate laminate using the support; a glass substrate laminate containing a support; a support-attached panel for a display device for producing a panel for a display device, using the glass substrate laminate; and a method for producing a panel for a display device using the glass substrate laminate.

BACKGROUND ART

In the field of liquid crystal displays (LCD) and organic EL displays (OLED), particularly of portable displays such as a digital camera, cellular telephone and the like, reduction of the weight and thickness of displays is an important problem.

For solving this problem, it is desired to further reduce the thickness of a glass substrate used in a display device. As a general method of reducing the thickness of a glass substrate, there is a method in which, before formation or after formation of members for a display device on the surface of a glass substrate, the glass substrate is etched by chemical etching, and if necessary, further, physical polishing is performed to reduce the thickness thereof.

However, in the case of performing an etching treatment and the like to reduce the thickness of a glass substrate before formation of members for a display device on the surface of the glass substrate, the strength of a glass substrate lowers and deflection thereof increases. Thus, there occurs a problem that it becomes difficult to carry out a treatment in an existing production line for panels for display devices.

In the case of performing an etching treatment and the like to reduce the thickness of a glass substrate after formation of members for a display device on the surface of a glass substrate, there occurs a problem of manifestation of fine scratches formed on the surface of the glass substrate in a process of forming members for a display device on the surface of a glass substrate, that is, generation of etchpits.

With the aim of solving such problems, there has been suggested a method in which a glass substrate having small thickness and a supporting substrate are stuck via a resin layer to obtain a laminate, and predetermined treatments for production of a display device are carried out under this condition, then, the surface of the glass substrate is peeled from the peelable surface of the resin layer, and other methods.

For example, patent document 1 describes a glass substrate laminate obtained by laminating a glass substrate and a supporting substrate in which the glass substrate and the supporting substrate have a peelable surface, and they are laminated via a silicone resin layer showing non-pressure-sensitive adhesiveness.

CITATION LIST

Patent Document

Patent Document 1: WO 2007/018028 pamphlet

SUMMARY OF THE INVENTION

Technical Problem

Patent document 1 discloses that a silicone resin layer having a peelable surface and showing non-pressure-sensitive adhesiveness is composed of a cured material of a curable silicone resin composition of addition reaction type between a methylhydrogenpolysiloxane and a polysiloxane having an alkenyl group in the main chain structure thereof. As the structure of the polysiloxane having an alkenyl group to be used, compounds represented by the following compositional formula (3) or (4) are disclosed. In the formulae (3) and (4), m represents an integer of 2 or more and n represents an integer including 0.

[Chem. 1]

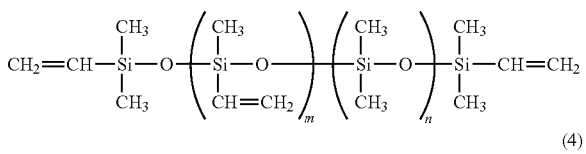

(3)

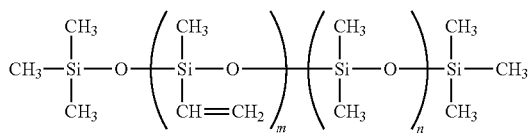

(4)

As methylhydrogenpolysiloxane, compounds represented by the following compositional formula (5) are disclosed. In the formula (5), a represents an integer including 0 and b represents an integer of 1 or more.

[Chem. 2]

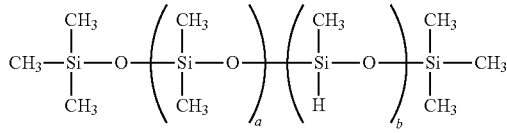

(5)

However, in an investigation carried out using these compounds described in patent document 1 by the present inventors, when a glass substrate laminate obtained by laminating a glass substrate and a supporting substrate having a resin layer was prepared, left for a long period of time, and then the glass substrate was peeled from the surface of the resin layer, the glass substrate was not peeled from the surface of the resin layer and a part thereof was broken, or a part of the resin of the resin layer remained on the glass substrate, resulting in extremely lowering the yield rate, in some cases.

In the case of application of the above-described glass substrate laminate for production of members for display devices such as a TFT array and the like of which production process is carried out under a high temperature environment of about 400° C., there was a problem of generation of foaming in the resin layer or at interfaces between the resin layer and both substrates, leading to requirement of further improvement.

For solving the above-described problems, the present invention has an object of providing a support for supporting a glass substrate, which is excellent in heat resistance, in which a temporal increase in peeling strength between the support and a glass substrate to be laminated is suppressed, further on which the laminated glass substrate can be peeled without breakage in a short period of time, and which can be applied also for production processes under high temperature condition such as production of a TFT array, and the like; and a method for producing the support. Further, the present invention also has an object of providing a glass substrate laminate using the support; a method for producing a glass substrate laminate containing the support; a panel for a display device with the support, for producing a panel for a display devise; and a method for producing a panel for a display device using a glass substrate laminate.

Solution to Problem

The present inventors have intensively studied the conventional technologies and resultantly found an insufficient progress of a crosslinking reaction between compounds constituting a cured silicone resin layer in a support. Further, it has been found that, consequently, a cured silicone resin layer has insufficient heat resistance, and a hydrosilyl group remaining on the surface of a resin layer after curing is converted, via a hydrolysis reaction, into a silanol group which performs a condensation reaction with a silanol group on a glass substrate in lamination, thereby generating a problem of increase in peeling strength.

Based on the above-described finding, the present inventors have found that the above-described problem is solved by using a curable silicone resin composition of addition reaction type containing an organohydrogenpolysiloxane having a specific structure, leading to completion of the present invention.

That is, for attaining the above-described object, the present invention is, in a first aspect, a support having a supporting substrate and a cured silicone resin layer having a peelable surface and being disposed on one surface of the supporting substrate, for laminating a glass substrate on the surface of the cured silicone resin layer, wherein the above-described cured silicone resin is a cured material of a curable silicone resin composition containing the following linear organopolysiloxane (a) and the following linear organopolysiloxane (b), and the above-described cured silicone resin layer is a cured silicone resin layer formed by curing the above-described curable silicone resin composition on the surface of the above-described supporting substrate:

Linear organopolysiloxane (a): linear organopolysiloxane having at least two alkenyl groups per one molecule thereof;

Linear organopolysiloxane (b): linear organopolysiloxane having at least three hydrogen atoms bonded to a silicon atom per one molecule thereof, in which at least one of the hydrogen atoms bonds to a silicon atom at an end of the molecule.

In the first aspect, it is preferable that the molar ratio (hydrogen atom/alkenyl group) of all hydrogen atoms bonded to a silicon atom with respect to all alkenyl groups in the curable silicone resin composition is 0.7 to 1.05. Further, it is preferable that a material of the supporting substrate has a 5% heat weight reduction temperature of 300° C. or more. Moreover, it is preferable that the supporting substrate is a glass plate, silicon wafer, synthetic resin plate or metal plate.

A second aspect of the present invention provides a method of producing a support having a supporting substrate and a cured silicone resin layer having a peelable surface and being disposed on one surface of the supporting substrate for laminating a glass substrate on the surface of the cured silicone resin layer, the method comprising: applying a curable silicone resin composition containing the following linear organopolysiloxane (a) and the following linear organopolysiloxane (b) on one surface of the supporting substrate to form a layer of the curable silicone resin composition; followed by curing the above-described curing silicone resin composition to form the above-described cured silicone resin layer:

Linear organopolysiloxane (a): linear organopolysiloxane having at least two alkenyl groups per one molecule thereof;

Linear organopolysiloxane (b): linear organopolysiloxane having at least three hydrogen atoms bonded to a silicon atom per one molecule thereof, in which at least one of the hydrogen atoms bonds to a silicon atom at an end of the molecule.

A third aspect of the present invention provides a method for producing a glass substrate laminate, comprising: laminating a glass substrate on the surface of the cured silicone resin layer of the above-described support.

In the third aspect of the present invention, the thickness of the above-described glass substrate is preferably 0.05 to 0.4 mm.

A fourth aspect of the present invention provides a glass substrate laminate having a supporting substrate, a glass substrate and a cured silicone resin layer disposed therebetween, wherein the above-described cured silicone resin layer comprising a cured material of a curable silicone resin composition containing the following linear organopolysiloxane (a) and the following linear organopolysiloxane (b), and the peeling strength between the above-described glass substrate and the cured silicone resin layer is smaller than the peeling strength between the above-described supporting substrate and the cured silicone resin layer:

Linear organopolysiloxane (a): linear organopolysiloxane having at least two alkenyl groups per one molecule thereof;

Linear organopolysiloxane (b): linear organopolysiloxane having at least three hydrogen atoms bonded to a silicon atom per one molecule thereof, in which at least one of the hydrogen atoms bonds to a silicon atom at an end of the molecule.

In the fourth aspect, it is preferable that the above-described cured silicone resin layer is a layer formed by curing the above-described curable silicone resin composition under the condition of contacting with the surface of the supporting substrate and no-contacting with the surface of the glass substrate, and, after curing the curable silicone resin composition, allowing the composition to contact with the surface of the glass substrate. Further, it is preferable that the molar ratio (hydrogen atom/alkenyl group) of all hydrogen atoms bonded to a silicon atom with respect to all alkenyl groups in the curable silicone resin composition is 0.7 to 1.05. Furthermore, it is preferable that a material of the supporting substrate has a 5% heat weight reduction temperature of 300° C. or more. Moreover, it is preferable that the above-described supporting substrate is a glass plate, silicon wafer, synthetic resin plate or metal plate. Still more, it is preferable that the glass substrate has a thickness of 0.05 to 0.4 mm.

A fifth aspect of the present invention provides a support-attached panel for a display device, for producing a panel for a display device, obtained by forming at least a part of constituent members of a panel for a display device on the surface of the glass substrate of the above-described glass substrate laminate.

A sixth aspect of the present invention provides a method of producing a panel having a glass substrate for a display device, the method comprising: forming at least a part of constituent members of a panel for a display device on the surface of the glass substrate of the above-described glass substrate laminate; followed by separating the glass substrate from the supporting substrate with the cured silicone resin layer.

Advantageous Effects of Invention

The present invention is capable of providing a support for supporting a glass substrate, which is excellent in heat resistance, in which temporal increase in peeling strength between the support and a glass substrate to be laminated is suppressed, further on which the laminated glass substrate can be peeled without breakage in a short period of time, and which can be applied also for production processes under high temperature condition such as production of a TFT array, and the like, and a method for producing the support. Further, the present invention is also capable of providing a glass substrate laminate obtained by using the support; a method for producing the glass substrate laminate, a panel for a display device with the support, for producing a panel for a display device, obtained by using the glass substrate laminate; and a method for producing a panel for a display device using the glass substrate laminate.

More specifically, the resin of the resin layer of the support in the present invention is characterized in that it is composed of a cured silicone resin which is a cured material of a specific curable silicone resin composition of addition reaction type, and this specific curable silicone resin composition contains, as one of raw material components, an organohydrogenpolysiloxane having a linear structure and having, on at least one end thereof, a silicon atom to which a hydrogen atom is bonded. This organohydrogenpolysiloxane has higher reactivity, and gives a smaller amount of hydrogen atoms bonded to a silicon atom remaining in the cured silicone resin after the curing reaction, as compared with other organohydrogenpolysiloxanes. As a result, there is a feature that a temporal hydrolysis reaction of the cured silicone resin does not occur easily and a temporal change of physical properties such as peeling strength and the like is smaller. Thus, the present invention is characterized in that there is a scarce tendency of change of peeling strength, particularly, increase in peeling strength, between the resin layer and the glass substrate in lamination and after lamination of the glass substrate. Because of higher reactivity of the organohydrogenpolysiloxane, the degree of completion of the curing reaction is higher and the heat resistance of the resultant cured silicone resin is improved. Since suitable low peeling strength can be maintained stably for a long period of time, the resin layer is not easily broken in peeling of the glass substrate, and in the glass substrate laminate, the surface of the glass substrate and the peelable surface of the resin layer, closely adhered, can be peeled easily and in a short period of time.

Further, according to the method for producing a glass substrate laminate using the support of the present invention, generation of glass defects due to extraneous materials such as bubbles, dust and the like incorporated between the glass substrate and the resin layer and generation of etchpits can be suppressed.

BRIEF DESCRIPTION OF THE DRAWINGS

FIG. 1 is a schematic sectional view of one embodiment of a support-attached panel for a display device according to the present invention.

MODE FOR CARRYING OUT THE INVENTION

A support according to the present invention, a glass substrate laminate containing a support, a support-attached panel for a display device, and a panel for a display device are illustrated in detail below, referring to a preferred embodiment shown in a drawing.

FIG. 1 is a schematic sectional view of one embodiment of a support-attached panel for a display device according to the present invention.

The support-attached panel for a display device 10 shown in this drawing has a support 20 according to the present invention, and has a laminated structure composed of a supporting substrate 12, a resin layer 14, a glass substrate 16 and a constituent member 18 of a panel for a display device, laminated in this order. The thickness of each layer is not restricted by this drawing.

The supporting substrate 12 and the resin layer 14 constitute the support 20 according to the present invention, the support 20 and the glass substrate 16 constitute a glass substrate laminate 30 according to the present invention, and the glass substrate 16 and the constituent member 18 of a panel for a display device constitute a panel for a display device 40 according to the present invention (not including the support 20).

First, the layers constituting the support 20, the glass substrate laminate 30, the panel for a display device 40 and the support-attached panel for a display device 10, according to the present invention, will be explained.

<Supporting Substrate>

The supporting substrate 12 to be used in the present invention is not particularly restricted, providing that it supports the glass substrate 16 via the resin layer 14 described later, thereby reinforcing the strength of the glass substrate 16.

The material of the supporting substrate 12 is not particularly restricted, and glass, silicon, synthetic resins, metals and the like are exemplified as suitable examples, from the standpoint of industrially easy availability. Particularly, it is preferable that the supporting substrate 12 is a glass plate, silicon wafer, synthetic resin plate or metal plate.

In the case of adoption of glass as the material of the supporting substrate 12, glass having various compositions such as, for example, glass containing an alkali metal oxide (soda lime glass and the like), non-alkali glass, and the like may be used. Of these, non-alkali glass is preferable because of small heat shrinkage ratio.

The difference of linear expansion coefficient between the glass used in the supporting substrate 12 and the glass substrate 16 is preferably $150 \times 10^{-7}/°$ C. or less, more preferably $100 \times 10^{-7}/°$ C. or less, further preferably $50 \times 10^{-7}/°$ C. or less. The glass of the glass substrate 16 and the glass of the supporting substrate 12 may be made of the same material. In this case, the difference of linear expansion coefficient between both glasses is 0.

In the case of adoption of a plastic (synthetic resin) as the material of the supporting substrate 12, its kind is not particularly restricted, and exemplified are, for example, polyethylene terephthalate resins, polycarbonate resins, polyimide resins, fluorine resins, polyamide resins, polyaramide resins, polyether sulfone resins, polyether ketone resins, polyether ether ketone resins, polyethylene naphthalate resins, polyacrylic resins, various liquid crystal polymer resins, silicone resins and the like.

In the case of adoption of a metal as the material of the supporting substrate 12, its kind is not particularly restricted, and exemplified are, for example, stainless steel, copper and the like.

The heat resistance of the supporting substrate 12 is not particularly restricted, however, when the glass substrate 16 is laminated on the supporting substrate 12 and a TFT array or the like as a member for a display devise is formed thereon, it is preferable that the heat resistance is high. Specifically, if the temperature at which weight loss in the case of heating its material sample under an air atmosphere at a rate of 10° C./minute is over 5% is defined as the 5% heat weight reduction temperature, then, this temperature is preferably 300° C. or more. Further, this temperature is more preferably 350° C. or more.

In this case, any examples of the above-described glass are applicable from the standpoint of heat resistance.

As plastic materials which are preferable from the standpoint of heat resistance, exemplified are polyimide resins, fluorine resins, polyamide resins, polyaramide resins, polyether sulfone resins, polyether ketone resins, polyether ether ketone resins, polyethylene naphthalate resins, various liquid crystal polymer resins, and the like.

Although the thickness of the supporting substrate 12 is not particularly restricted, it is preferable that the supporting substrate 12 has a thickness at which the glass substrate laminate of the present invention can be treated in an existing production line for panels for a display device. For example, the thickness of the glass substrate currently used in liquid crystal displays is mainly in the range of 0.5 to 1.2 mm, and particularly, 0.7 mm in many cases. In the present invention, it is supposed to use predominantly a glass substrate which is thinner than this. In this case, if the thickness of the glass substrate laminate is approximately the same as that of a current glass substrate, a current production line can be easily adapted.

For example, if a current production line is designed to treat a substrate having a thickness of 0.5 mm and the thickness of the glass substrate is 0.1 mm, then, the sum of the thickness of the supporting substrate and the thickness of the resin layer is adjusted to 0.4 mm. Further, most general current production lines are designed to treat a glass substrate having a thickness of 0.7 mm, and if the thickness of the glass substrate is, for example, 0.4 mm, then, the sum of the thickness of the supporting substrate and the thickness of the resin layer is adjusted to 0.3 mm.

The glass substrate in the present invention is not limited to liquid crystal displays, and the present invention is not intended only to adapt a glass substrate laminate to a current production line for panels for a display device. Therefore, the thickness of the supporting substrate 12 is preferably in the range of 0.1 to 1.1 mm, although it is not limited. Further, it is preferable that the thickness of the supporting substrate 12 is larger than that of the glass substrate 16. When the supporting substrate 12 is a glass plate, particularly, the thickness is preferably 0.3 mm or more. When the supporting substrate 12 is a glass plate, thickness thereof is more preferably 0.3 to 0.8 mm, further preferably 0.4 to 0.7 mm.

The surface of the supporting substrate 12 constituted of various materials described above may be a polished surface which has been subjected to a polishing treatment, or a non-etched surface (raw surface) which has not been subjected to a polishing treatment, in the case of adoption of a glass substrate as the supporting substrate. From the standpoint of productivity and cost, a non-etched surface (raw surface) is preferable.

The supporting substrate 12 has a first main surface and a second main surface and the shape thereof is not restricted, however, a rectangle form is preferable. Here, the rectangle form includes also forms which are substantially approximate rectangle and of which peripheral angles are cut (corner cut).

Although the size of the supporting substrate 12 is not restricted, in the case of, for example, rectangle, it may be 100 to 2000 mm×100 to 2000 mm, preferably 500 to 1000 mm×500 to 1000 mm.

<Resin Layer (Cured Silicone Resin Layer)>

The resin layer 14 according to the present invention is fixed on the above-described first main surface of the supporting substrate 12, and in the case of a glass substrate laminate obtained by lamination of the glass substrate 16, the resin layer 14 is closely adhered to a first main surface of the glass substrate 16 having a first main surface and a' second main surface. It is necessary that the peeling strength between the first main surface of the glass substrate 16 and the resin layer 14 is smaller than the peeling strength between the first main surface of the supporting substrate 12 and the resin layer 14. That is, in separating the glass substrate 16 and the supporting substrate 12, it is necessary that peeling occurs at an interface between the first main surface of the glass substrate 16 and the resin layer 14 and peeling is difficult at an interface between the first main surface of the supporting substrate 12 and the resin layer 14. Owing to this, the resin layer 14 has a surface property by which the resin layer 14 adheres closely to the first surface of the glass substrate 16, however, the glass substrate 16 can be easily peeled. Thus, the resin layer 14 binds to the first main surface of the glass substrate 16 with certain bonding force, thereby preventing displacement of the glass substrate 16, and at the same time, in peeling of the glass substrate 16, peeling can be performed easily without breakage of the glass substrate 16 at this bonding force level. In the present invention, this easily peelable nature of the surface of the resin layer is referred to as peelability. In contrast, the first main surface of the supporting substrate 12 and the resin layer 14 are bound with bonding force at which there occurs a relatively un-peelable phenomenon.

In the glass substrate laminate 30 of the present invention, it is preferable that the resin layer 14 and the glass substrate 16 do not attach with a pressure-sensitive adhesive force as manifested by a pressure-sensitive adhesive, but attach with force ascribable to van der Waals force between solid molecules, that is, with close adhesion force.

On the other hand, the bonding force of the resin layer 14 to the first main surface of the supporting substrate 12 is relatively higher than the bonding force to the first main surface of the glass substrate 16. In the present invention, bond to the first main surface of the glass substrate 16 is called as close adhesion, and bond to the first main surface of the supporting substrate 12 is called as fixing.

Since the resin layer 14 has high flexibility, even if extraneous materials such as bubbles, dust and the like are incorporated between the glass substrate 16 and the resin layer 14, generation of a deformation defect of the glass substrate 16 can be suppressed.

In order to relatively lowering the peeling strength of the resin layer 14 to the first main surface of the glass substrate 16 and to relatively increasing the peeling strength of the resin layer 14 to the first main surface of the supporting substrate 12, it is preferable to cure a curable silicone resin composition on the first main surface of the supporting substrate 12 to form the resin layer 14 composed of a cured silicone resin, followed by laminating the glass substrate 16 on the resin layer 14 composed of a cured silicone resin to cause close adhesion between them. The cured silicone resin in the present invention is the same resin as a non-pressure-sensitive adhesiveness cured silicone resin used in release paper and the like, and even if it is closely adhered to the glass substrate 16, peeling strength thereof is low. However, it is considered that, when a curable silicone resin composition which shall become a cured silicone resin is cured on the surface of the supporting substrate 12, adhesion is attained due to a mutual action with the surface of the supporting substrate in the curing reaction, and the peeling strength between the curing silicone resin and the surface of the supporting substrate after curing increases. Therefore, even if the glass substrate 16 and the supporting substrate 12 are made of the same material, a difference can be made in peeling strength between the resin layer and both substrates.

Formation of the resin layer 14 showing a difference between the peeling strength against the first main surface of the glass substrate 16 and the peeling strength against the first main surface of the supporting substrate 12 is not limited to the above-described method. For example, in the case of using the supporting substrate 12 made of a material showing higher close adhesion to the surface of the cured silicone resin than the glass substrate 16, the glass substrate 16 and the supporting substrate 12 can be simultaneously laminated via a cured silicone resin film. When adhesion owing to curing of a curable silicone resin composition is sufficiently lower to the glass substrate 16 and its adhesion is sufficiently higher to the supporting substrate 12, the curable silicone resin composition can be cured between the glass substrate 16 and the supporting substrate 12 to form the resin layer 14. Even if the supporting substrate 12 is made of the same glass material as the glass substrate 16, it is possible to perform a treatment for enhancing the adhesion of the surface of the supporting substrate 12, thereby enhancing the peeling strength against the resin layer 14. For example, bonding force to the resin layer 14 can be enhanced by performing a treatment for increasing the concentration of a silanol group on the surface of the supporting substrate 12 made of a glass material.

The curable silicone resin composition of addition reaction type is a curable composition containing a linear organoalkenylpolysiloxane and a linear organohydrogenpolysiloxane, and additives such as a catalyst and the like, and is cured by heating to become a cured silicone resin. The resin layer 14 in the present invention is, specifically, a layer of a cured silicone resin obtained by curing a curable silicone resin composition of addition reaction type containing a linear organopolysiloxane (a) which is a linear organoalkenylpolysiloxane and a linear organopolysiloxane (b) which is a specific organohydrogenpolysiloxane. In general, curable silicone resin compositions of addition reaction type perform a curing reaction easily, show lower curing shrinkage, and give a cured material showing good extent of peelability, as compared with other curable silicone resin compositions. Of these, the cured material of the curable silicone resin composition of addition reaction type in the present invention shows, particularly, little temporal change of peeling strength, thus, has excellent heat resistance. In general, as curable silicone resin compositions of addition reaction type, solvent type compositions, emulsion type compositions, and non-solvent type compositions may be used. Also as the curable silicone resin composition in the present invention, any type of compositions can be used.

As the curable silicone resin composition of addition reaction type containing a linear organopolysiloxane (a) and a linear organopolysiloxane (b), known compositions can be used, and for example, JP-T-2005-509711 (international publication number: WO 2003/044084) and cited literatures thereof describe curable silicone resin compositions of addition reaction type for forming a water-repellent and peelable silicone membrane on a paper or plastic film. However, cured silicone resins obtained from these known curable silicone resin compositions of addition reaction type are used for applications such as release paper and the like, and there is no suggestion on the application of the present invention. An effect of high peelability is common to the application of the present invention, however, there is no suggestion on effects required in the present invention such as heat resistance and the like.

The curable silicone resin composition to be used for formation of the resin layer 14 will be illustrated in detail below.

<Linear Organopolysiloxane (B)>

The curable silicone resin composition in the present invention contains a linear organopolysiloxane (a) and a linear organopolysiloxane (b). Of these, the linear organopolysiloxane (b) is a kind of organohydrogenpolysiloxane. The linear organopolysiloxane (b) is a linear organopolysiloxane having at least three hydrogen atoms bonded to a silicon atom per one molecule thereof, in which at least one of the above-described hydrogen atoms bonds to a silicon atom at an end of the molecule thereof.

In general, a mono-functional unit at both ends of a linear organopolysiloxane is called as an M unit, a bi-functional unit other than units at both ends is called as a D unit, and the structure of a linear organopolysiloxane having n D units is represented by $M(D)_nM$. In the case of an average composition of units, it is represented by $M_2(D)_n$, in some cases.

The linear organopolysiloxane (b) in the present invention is characterized in that a hydrogen atom bonded to a silicon atom is present on at least one of two M units. A more preferable linear organopolysiloxane (b) is a linear organopolysiloxane in which a hydrogen atom bonded to a silicon atom is present on both of two M units, and a hydrogen atom bonded to a silicon atom is present also on a part of n D units. The linear organopolysiloxane (b) can also be used together with other linear organohydrogenpolysiloxanes. Other linear organohydrogenpolysiloxanes are linear organohydrogenpolysiloxanes in which a hydrogen atom bonded to a silicon atom is not present on an M unit and a hydrogen atom bonded to a silicon atom is present only on a part of D units.

As the linear organopolysiloxane (b) or a mixture of the linear organopolysiloxane (b) and other linear organohydrogenpolysiloxane, a linear organopolysiloxane having an average composition represented by the following formula (1) is preferable. Hereinafter, the organohydrogenpolysiloxane represented by this average composition formula is referred to as an organohydrogenpolysiloxane (1).

$$(M^1)_\alpha (M^2)_\beta (D^1)_\gamma (D^2)_\delta \quad (1)$$

Here, $M^1$ represents an M unit on which a hydrogen atom bonded to a silicon atom is not present, $M^2$ represents an M unit on which a hydrogen atom bonded to a silicon atom is present, $D^1$ represents a D unit on which a hydrogen atom bonded to a silicon atom is not present and $D^2$ represents a D unit on which a hydrogen atom bonded to a silicon atom is present, α represents a number of 0 or more and less than 2 and β represents a number of 2 or less excluding 0 wherein α+β=2, γ represents a number of over 0 and δ represents a number of 0 or more wherein γ+δ=n. In a more preferable organohydrogenpolysiloxane (1), α represents a number of 0 or more and less than 1, β represents a number of 1 or more and 2 or less, γ represents a number of 1 or more, and δ represents a number of 1 or more. The organohydrogenpolysiloxane represented by the formula (5) described in WO 2007/018028 is a compound in which β=0.

The linear organopolysiloxane (b) is a compound of the above-described formula (1) in which β represents a number of 1 or more and 2 or less. A preferable linear organopolysiloxane (b) is a compound in which α represents a number of 0 or more and less than 1, β represents a number of 1 or more and 2 or less, γ represents a number of 1 or more, and δ represents a number of 1 or more.

The $M^2$ unit may have two or three hydrogen atoms bonded to a silicon atom, and preferably has one hydrogen atom. The $D^2$ unit may have two hydrogen atoms bonded to a silicon atom, and preferably has one hydrogen atom. The $M^1$ unit, $D^1$ unit, preferable $M^2$ unit and preferable $D^2$ unit are preferably those represented by the following formulae. $R^1$ to $R^5$ represent each independently an alkyl group or fluoroalkyl group having 4 or less carbon atoms or a phenyl group. Preferably, all of $R^1$ to $R^5$ represent a methyl group.

[Chem. 3]

$M^1$:

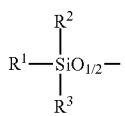

$M^2$:

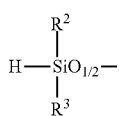

$D^1$:

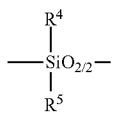

$D^2$:

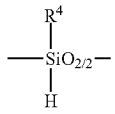

When the $D^2$ unit is present (when δ is not 0), γ/δ which is an existence ratio of $D^1$ to $D^2$ is an index representing the density of hydrogen atoms bonded to a silicon atom in the molecule. This existence ratio (γ/δ) is preferably 0.2 to 30, particularly preferably 0.5 to 20. When this existence ratio is too small, the remaining amount of unreacted hydrogen atoms bonded to a silicon atom increases in the cured silicone resin, thus, temporal change in the peeling strength of the cured silicone resin against the glass substrate increases, generating a possibility of causing decrease in heat resistance. When this existence ratio is too large, the crosslinked density of the cured silicone resin lowers, thus, there occurs a possibility of causing decrease in heat resistance.

β/δ resenting the existence ratio of the $M^2$ unit to the $D^2$ unit is preferably $15 \leq (\beta/\delta) \times 1000 \leq 1500$, more preferably $15 \leq (\beta/\delta) \times 1000 \leq 1000$, particularly preferably $15 \leq (\beta/\delta) \times 1000 \leq 500$. When $(\beta/\delta) \times 1000$ is smaller than 15, the molecular weight increases, or the steric hindrance of a functional group increases, thus, reactivity lowers, thereby generating a possibility of increase of temporal change in the peeling strength of the cured silicone resin against the glass substrate. In contrast, when $(\beta/\delta) \times 1000$ is larger than 1500, the crosslinked density decreases, thus, there is a concern that it is not possible to obtain a cured silicone resin having sufficient physical properties such as strength and the like.

The above-described formula (1) shows an average composition of organosiloxane units in an organohydrogenpolysiloxane, and in individual molecules of the linear organopolysiloxane (b), α is an integer of 0 or 1 and β is an integer of 1 or 2 wherein α+β=2, γ is an integer of 1 or more, and δ is an integer of 0 or more.

Individual molecules of organohydrogenpolysiloxanes other than the linear organopolysiloxane (b) are organohydrogenpolysiloxanes in which α is 2, β is 0, γ is an integer of 0 or more and δ is an integer of 1 or more. When a plurality of $D^1$s and $D^2$s are present in these molecules, the arrangement of $D^1$ and $D^2$ may be a random copolymer chain structure or a block copolymer chain structure. It is considered that, usually, ring-opening polymerization of a cyclic siloxane forms a copolymer chain, thereby producing a structure in which blocks of ring-opened cyclic siloxanes are randomly copolymerized.

As described above, the linear organopolysiloxane (b) includes not only organohydrogenpolysiloxanes in which individual molecules are linear organopolysiloxanes (b), but may also include mixtures (its average composition is represented by the above-described formula (1)) of linear organopolysiloxanes (b) and other organohydrogenpolysiloxanes. In this case, the content of the linear organopolysiloxanes (b) is preferably 20 mol % or more based on the total mol number of organohydrogenpolysiloxanes to be used. When less than 20 mol %, a hydrogen atom bonded to a silicon atom tends to remain and the peeling strength at an interface of resin layer 14/glass substrate 16 tends to temporally increase, therefore, this range is not preferable. The content of linear organopolysiloxanes (b) is preferably 50 mol % or more, more preferably 80 mol % or more, from the standpoint of more excellent heat resistance of the cured silicone resin and more excellent temporal stability of the peeling strength between the resin layer 14 and the glass substrate.

<Linear Organopolysiloxane (a)>

The curable silicone resin composition in the present invention contains a linear organopolysiloxane (a) reacting with a linear organopolysiloxane (b). The linear organopolysiloxane (a) is a linear organopolysiloxane having at least two alkenyl groups per one molecule thereof. The linear organopolysiloxane having alkenyl groups is referred, hereinafter, to as an organoalkenylpolysiloxane.

The alkenyl group is not particularly restricted and examples thereof include a vinyl group (ethenyl group), allyl group (2-propenyl group), butenyl group, pentenyl group, hexynyl group and the like, and of these, preferable is a vinyl group from the standpoint of excellent heat resistance.

In the linear organopolysiloxane (a), an alkenyl groups is present on the M unit or the D unit, and may also be present on both the M unit and the D unit. From the standpoint of curing speed, it is preferable that an alkenyl group is present at least on the M unit, and it is preferable that an alkenyl group is present on both the two M units. For an organoalkenylpolysiloxane having an alkenyl group only on the M unit, if its molecular weight becomes higher, then, the alkenyl group concentration per molecule lowers and the crosslinked density of the cured silicone resin lowers, thereby generating a possibility of causing decrease in heat resistance, thus, it is preferable that an alkenyl group is present on the M unit and at the same time also on a part of the D units.

As the linear organopolysiloxane (a), linear organopolysiloxanes having an average composition represented by the following formula (2) are preferable.

Here, $M^1$ represents an M unit on which an alkenyl group is not present (the same as the above-described $M^1$ unit), $M^3$ represents an M unit on which an alkenyl unit bonded to a silicon atom is present, $D^1$ represents a D unit on which an alkenyl group is not present (the same as the above-described $D^1$ unit) and $D^3$ represents a D unit on which an alkenyl unit bonded to a silicon atom is present, and a represents a number of 0 to 2 and b represents a number of 0 to 2 wherein a+b=2, c represents a number of 0 or more and d represents a number of 0 or more wherein c+d=n (here, b+d is 2 or more). In more preferable organoalkenylpolysiloxanes represented by the formula (2), a represents a number of 0 or more and less than 1, b represents a number of 1 or more and 2 or less, c represents a number of 1 or more, and d represents a number of 1 or more.

The $M^3$ unit may have two or three alkenyl groups bonded to a silicon atom, and preferably has one alkenyl group. The $D^3$ unit may have two alkenyl groups bonded to a silicon atom, and preferably has one alkenyl group. As the alkenyl group, a vinyl group is preferable. The $M^1$ unit, $D^1$ unit, preferable $M^3$ unit and preferable $D^3$ unit are preferably those represented by the following formulae. $R^1$ to $R^5$ represent each independently an alkyl group or fluoroalkyl group having 4 or less carbon atoms or a phenyl group, like the above-described case. Preferably, all of $R^1$ to $R^5$ represent a methyl group.

[Chem. 4]

$M^1$:

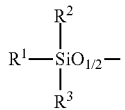

$M^2$:

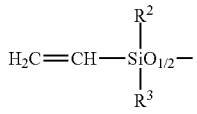

$D^1$:

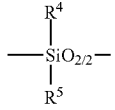

$D^3$:

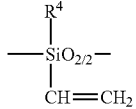

The above-described formula (2) shows an average composition of organosiloxane units in an organoalkenylpolysiloxane, and in individual molecules of the linear organopolysiloxane (a), a is an integer of 0 or 1 and b is an integer of 1 or 2 wherein a+b=2, c is an integer of 1 or more, and d is an integer of 0 or more. In the linear organopolysiloxane (a), two or more alkenyl groups are present per molecule, therefore, b+d is 2 or more. The organoalkenylpolysiloxane (a) may be a mixture with other organoalkenylpolysiloxanes, however, in usual cases, the organoalkenylpolysiloxane (a) is singly used. The organoalkenylpolysiloxane (a) may also be a mixture of two or more organoalkenylpolysiloxanes (a). When two organoalkenylpolysiloxanes having different La values (the equivalent number of alkenyl groups per 100 grams) are used together, a more advantageous effect is obtained.

Like the case of the above-described organohydrogenpolysiloxane, when a plurality of $D^1$s and $D^3$s are present in organoalkenylpolysiloxanes, in the above-described formula (2), the arrangement of $D^1$ and $D^3$ may be a random copolymer chain structure or a block copolymer chain structure. As the organoalkenylpolysiloxane (a), organoalkenylpolysiloxanes represented by the formula (3) or the formula (4) described in WO 2007/018028 pamphlet can be used.

The weight-average molecular weight Mw of the organoalkenylpolysiloxane (a) is preferably in the range of $1,000 \leq Mw \leq 5,000,000$. More preferably, Mw is in the range of $2,000 \leq Mw \leq 3,000,000$, further preferably $3,000 \leq Mw \leq 1,000,000$. When Mw is in this range, sublimation does not occur in heat-curing, and too high viscosity is not generated, thus, workability is excellent.

Further, if the equivalent number of alkenyl groups per 100 grams of the organoalkenylpolysiloxane (a) is represented by La, it is preferably in the range of $0.001 \leq La \leq 1.0$. More preferably, La is in the range of $0.0015 \leq La \leq 0.9$, further preferably $0.002 \leq La \leq 0.9$. When La is in this range, the heat resistance of the cured silicone resin is excellent, and temporal stability of the peeling strength between the layer of the cured silicone resin and the glass substrate is improved.

Although the content ratio of the linear organopolysiloxane (a) and the linear organopolysiloxane (b) in the curable silicone resin composition is not particularly restricted, it is preferable to adjust the content ratio so that the molar ratio (hydrogen atom/alkenyl group) of hydrogen atoms bonded to a silicon atom in the linear organopolysiloxane (b) to all alkenyl groups in the linear organopolysiloxane (a) is 0.7 to 1.05. Particularly, it is preferable to adjust the content ratio so that the molar ratio is 0.8 to 1.0. When the molar ratio of hydrogen atoms bonded to a silicon atom to alkenyl groups exceeds 1.05, the peeling force of the cured silicone resin after leaving for a long period of time tends to increase, thus, peelability may be possibility insufficient. Particularly, in the case of production of LCD and the like, a support is peeled after a considerable period after lamination of a glass substrate in many cases, thus, peelability after leaving for a long period of time is a significant problem. When the molar ratio of hydrogen atoms bonded to a silicon atom to alkenyl groups is less than 0.7, the crosslinked density of the cured silicone resin lowers, resulting in a possibility of generation of a problem in chemical resistance and the like.

Although the reason for increase in peeling force after leaving for a long period of time when the molar ratio of hydrogen atoms bonded to a silicon atom to alkenyl groups is over 1.05 is not clear, it is considered that, by leaving for a long period of time, water in air gradually invades from the end of the laminate, as a result, unreacted hydrosilyl groups (Si—H group) in the cured silicone resin are hydrolyzed, and a certain reaction of them with silanol groups on the surface of the glass substrate is correlated with the increase in peeling force. Therefore, it is preferable that unreacted hydrogen atoms bonded to a silicon atom do not substantially remain in the resin layer 14.

<Other Constituent Component>

In the curable silicone resin composition in the present invention, various additives may be contained in a range not deteriorating the effect of the present invention, if necessary. As the additive, it is usually preferable to use a catalyst for promoting a reaction of hydrogen atoms bonded to a silicon atom with alkenyl groups (catalyst for addition reaction). As this catalyst, platinum metal catalysts are preferably used. The platinum metal catalysts include platinum catalysts, palladium catalyst, rhodium catalyst and the like, and particularly, platinum catalysts are preferably used from the standpoint of economy and reactivity. As the platinum catalyst, known catalysts can be used. Specifically mentioned are a platinum fine powder, platinum black, chloroplatinic acids such as tetrachloroplatinate, hexachloroplatinate and the like, platinum tetrachloride, alcohol compounds and aldehyde compounds of chloroplatinic acids, or olefin complexes, alkenylsiloxane complexes and carbonyl complexes of platinum, and the like.

The concentration of the catalyst is preferably 2 to 400 ppm in terms of weight ratio to the total weight of the linear organopolysiloxane (a) and the linear organopolysiloxane (b). It is more preferably 5 to 300 ppm, further preferably 8 to 200 ppm.

In the curable silicone resin composition in the present invention, further, an activity suppressing agent (compound referred to also as reaction suppressing agent, retarding agent or the like) having an action of suppressing catalytic activity for the purpose of adjusting catalytic activity is preferably used together with the catalyst. Examples of the activity suppressing agent include various organonitrogen compounds, organophosphorus compounds, acetylene compounds, oxime compounds, organic chloro compounds and the like. Further, if necessary, inorganic fillers such as various silicas, calcium carbonate, iron oxide and the like may be contained in a range not deteriorating the effect of the present invention.

Further, dispersing media such as organic solvents such as hexane, heptanes, octane, toluene, xylene and the like, and water and the like can be blended in the curable silicone resin composition of the present invention for the purpose of improving workability for application of the curable silicone resin composition, although these dispersing media are components not constituting the cured silicone resin.

<Formation of Resin Layer>

As described above, it is preferable to allow the curable silicone resin composition to be cured on the first main surface of the supporting substrate 12 to form the resin layer 14 composed of the cured silicone resin. For this, the curable silicone resin composition is applied on one surface of the supporting substrate to form a layer of the curable silicone resin composition, then, the curable silicone resin composition is cured to form a layer of the cured silicone resin. For formation of a layer of the curable silicone resin composition, the composition is applied as it is when the curable silicone resin composition is a flowable composition, and the composition is applied with an organic solvent blended when the curable silicone resin composition is a composition of low flowability or a composition of no flowability. Further, an emulsified solution or dispersed solution of the curable silicone resin composition, and the like can also be used. A coated membrane containing a volatile component such as an organic solvent and the like is, then, deprived of its volatile component by evaporation, to obtain a layer of the curable silicone resin composition. Curing of the curable silicone resin composition can be carried out in succession to evaporation-removal of a volatile component.

Curing of the curable silicone resin composition is not limited to the above-described method. For example, it is possible that the curable silicone resin composition is cured on a certain peelable surface to produce a film of the cured silicone resin, and this film is laminated with a supporting substrate to produce a support. When the curable silicone resin composition contains no volatile component, it can be sandwiched between the glass substrate 16 and the supporting substrate 12 and cured, as described above.

When the curable silicone resin composition is applied on one surface of a supporting substrate to form a layer of the curable silicone resin composition, the application method is not particularly restricted, and conventionally known methods are mentioned. The known methods include a spray coat method, die coat method, spin coat method, dip coat method, roll coat method, bar coat method, screen printing method, and gravure coat method. Among such methods, the method can be appropriately selected depending on the kind of the composition. For example, in the case of no blending of a volatile component into the curable silicone resin composition, a die coat method, spin coat method or screen printing method is preferable. In the case of a composition in which a volatile component such as a solvent and the like is blended, the volatile component is removed by heating and the like before curing, then, the composition is cured.

Conditions for curing the curable silicone resin composition vary depending on the kind of the organopolysiloxane to be used and the like, and optimum conditions are appropriately selected. Usually, the heating temperature is preferably 50 to 300° C., and the treating time is preferably 5 to 300 minutes.

More specific heat curing conditions vary depending on the blending amount of a catalyst, and for example, in the case of blending 2 parts by weight of a platinum catalyst with respect to 100 parts by weight of the total amount of resins contained in the curable silicone resin composition, the composition is cured by reacting in atmospheric air at 50° C. to 300° C., preferably 100° C. to 270° C. In this case, the reaction time is 5 to 180 minutes, preferably 60 to 120 minutes.

If the resin layer has a low silicone migration property, when the glass substrate is peeled, components in the resin layer do not easily migrate into the glass substrate. For obtaining a resin layer having a low silicone migration property, it is preferable to progress the curing reaction as much as possible so that unreacted silicone components do not remain in the resin layer. The reaction temperature and the reaction time as described above are preferable since, then, unreacted organosilicone components do not substantially remain in the resin layer. When too longer than the above-described reaction time or too higher than the above-described reaction temperature, oxidation decomposition of the organosilicone component and the cured silicone resin occur simultaneously, and an organosilicone component of low molecular weight is generated, causing a possibility of increase in a silicone migration property. To progress the curing reaction as much as possible so that unreacted organosilicone components do not remain in the resin layer is preferable also for excellent peelability after the heating treatment.

For obtaining high fixing force (high peeling strength) between the resin layer and the supporting substrate, a surface modification treatment (priming treatment) may be carried on the surface of the supporting substrate. For example, a chemical method for chemically improving fixing force such as use of a silane coupling agent (primer treatment), a physical method of increasing surface active groups such as a flame treatment, a mechanical method of increasing engagement by increasing the roughness of the surface such as a sand blast treatment, and the like, are exemplified.

The thickness of the resin layer 14 made of the above-described cured silicone resin is not particularly restricted, and the optimum thickness is appropriately selected depending on the kind of the glass substrate 16 and the like. Particularly, the thickness is preferably 5 to 50 μm, more preferably 5 to 30 μm, further preferably 7 to 20 μm. When the thickness of the resin layer is in such a range, close adhesion between the surface of the glass substrate 16 and the resin layer 14 is more excellent. Even if bubbles or extraneous materials intervene, generation of a deformation defect of the glass substrate 16 can be further suppressed. When the thickness of the resin layer 14 is too large, a longer time and a larger amount of materials are required for formation thereof, leading to diseconomy.

The resin layer 14 may be composed of two layers. In this case, "the thickness of the resin layer" means the total thickness of all layers.

When the resin layer 14 is composed of two or more layers, the kinds of resins forming respective layers may be different.

In the resin layer 14, the surface tension of its peelable surface is preferably 30 mN/m or less, more preferably 25 mN/m or less, further preferably 22 mN/m or less. Although there is no restriction on the lower limit, it is preferably 15 mN/m or more.

With such surface tension, peeling from the surface of the glass substrate 16 is easier, and simultaneously, close adhesion to the surface of the glass substrate is sufficient.

It is preferable that the resin layer 14 has glass transition point lower than room temperature (about 25° C.) or is made of a material having no glass transition point, since with the glass transition point as described above, suitable elasticity can be obtained while maintaining non-pressure-sensitive adhesiveness, and peeling from the surface of the glass substrate 16 can be carried out easily, and simultaneously, close adhesion to the surface of the glass substrate is sufficient.

It is preferable that the resin layer 14 has excellent heat resistance, since in the case, for example, of formation of a constituent member 18 of a panel for a display device on the second main surface of the glass substrate 16, the glass substrate laminate 30 of the present invention can be subjected to a heat treatment under high temperature condition. The above-described cured silicone resin in the present invention has sufficient heat resistance which endures this heat treatment.

More specifically, the heat decomposition initiation temperature of the resin layer 14 made of the above-described cured silicone resin of the present invention can be 400° C. or more under glass substrate laminated condition. This heat resistant temperature is preferably 420° C. or more, particularly preferably 430° C. to 450° C. Within the above-described range, decomposition of the resin layer is suppressed and generation of foaming in the glass substrate laminate is further suppressed, even under high temperature condition (about 400° C. or more) such as in a production process of a TFT array, and the like.

The heat decomposition initiation temperature is represented by the following measurement method.

A resin layer (thickness=about 15 to 20 μm) is formed on a supporting substrate of 50 mm square (thickness=about 0.4 to 0.6 mm), and a glass substrate of likewise 50 mm square (thickness=about 0.1 to 0.4 mm) is further laminated to obtain an evaluation sample. This sample is placed on a hot plate heated at 300° C., heated at a temperature raising rate of 10° C. per minute, and the temperature at which a foaming phenomenon is recognized in the sample is defined as the heat decomposition initiation temperature.

When the elastic modulus of the resin layer 14 is too high, there is a tendency of lowering of close adhesion to the surface of the glass substrate 16. In contrast, when the elastic modulus is too low, peelability lowers in some cases. The cured silicone resin of the present invention has elastic modulus satisfying this required performance.

<Support>

The support 20 according to the present invention is constituted of the supporting substrate 12 and the resin layer 14 described above, in the illustrated example. Since the surface of the resin layer 14 shows an excellent peeling performance, the glass substrate laminated thereon can be peeled without breakage. Therefore, it can be suitably used as a support for supporting the glass substrate. Other applications include a support for an organic EL illumination glass substrate, and the like.

<Glass Substrate>

The glass substrate 16 is a glass substrate on which the constituent member 18 of a panel for a display device described later is formed, to produce a panel for a display device.

The method for producing the glass substrate 16 used in the present invention is not particularly restricted, and it can be produced by conventionally known methods. For example, conventionally known glass raw materials are melted to obtain molten glass, then, molded into a plate by a float process, fusion process, slot downdraw process, redraw process, lifting process and the like, thus, the glass substrate can be obtained. Further, commercially available articles can also be used.

The thickness, shape, size, physical properties (heat shrinkage ratio, surface form, chemical resistance and the like), composition and the like of the glass substrate 16 are not particularly restricted, and for example, may be the same as those of conventional glass substrates for displays such as LCD, OLED and the like.

The thickness of the glass substrate 16 is not particularly restricted, and preferably less than 0.7 mm, more preferably 0.5 mm or less, further preferably 0.4 mm or less. In contrast, it is preferably 0.05 mm or more, more preferably 0.07 mm or more, further preferably 0.1 mm or more.

The glass substrate 16 has a first main surface and a second main surface, and although its shape is not restricted, a rectangle form is preferable. Here, the rectangle form includes also forms which are substantially approximate rectangle and of which peripheral angles are cut (corner cut).

Although the size of the glass substrate 16 is not restricted, in the case of, for example, rectangle, it may be 100 to 2000 mm×100 to 2000 mm, preferably 500 to 1000 mm×500 to 1000 mm.

With preferable thickness and preferable size as described above, the glass substrate 16 and the support 20 can be easily peeled in the glass substrate laminate 30 of the present invention.

The properties of the glass substrate 16 such as heat shrinkage ratio, surface form, chemical resistance and the like are not particularly restricted, and vary depending on the kind of panel for a display device to be produced.

It is preferable that the glass substrate 16 has small heat shrinkage ratio. Specifically, the linear expansion coefficient as an index of heat shrinkage ratio is preferably $150 \times 10^{-7}/°$ C. or less, more preferably $100 \times 10^{-7}/°$ C. or less, further preferably $45 \times 10^{-7}/°$ C. or less, since when the heat shrinkage ratio is large, a highly precise display cannot be fabricated easily.

In the present invention, the linear expansion coefficient means one defined in JIS R3102 (1995).

The glass substrate 16 is made of, for example, alkali glass, non-alkali glass and the like. Of these, non-alkali glass is preferable because of its small heat shrinkage ratio.

The surface of the glass substrate 16 described above may be a polished surface which has been subjected to a polishing treatment, or a non-etched surface (raw surface) which has not been subjected to a polishing treatment. That is, materials satisfying flatness depending on required precision of a display panel to be prepared may be appropriately selected.

<Glass Substrate Laminate>

The glass substrate laminate 30 according to the present invention is constituted of the above-described supporting substrate 12, resin layer 14 and glass substrate 16, in the illustrated example.

As described above, the resin layer 14 has a peelable surface, and the glass substrate 16 and the panel for a display device 40 (glass substrate 16 on which the constituent member 18 of the panel for a display device is formed) can be easily peeled. More specifically, the peeling strength between the surface of the resin layer 14 and the surface of the glass substrate 16 is preferably 8.5N/25 mm or less, more preferably 7.8N/25 mm or less, particularly preferably 4.5N/25 mm or less. Within the above-described range of strength, breakage of the resin layer in peeling, breakage of the glass substrate and the like do not easily occur, thus, the above-described range is preferable. Regarding the lower limit, adhesion force not causing displacement of the glass substrate on the resin layer may be advantageous, and usually, it is preferably 1.0N/25 mm or more.

It is preferable that also peeling strength after evaluation of temporal stability of close adhesion strength which is an index of close adhesion shown in examples described later is in the above-described range.

Peeling strength between the surface of the resin layer and the surface of the glass substrate is represented by the following measurement method.

A resin layer (thickness=about 15 to 20 μm) is formed on the whole surface of a supporting substrate of 25×50 mm square (thickness=about 0.4 to 0.6 mm), and a glass substrate of 25×75 mm square (thickness=about 0.1 to 0.4 mm) is laminated to obtain an evaluation sample. A non-sucked surface of the supporting substrate of the sample is fixed to the end of a table by a double-sided adhesive tape, and the center of the protruding glass substrate (25×25 mm) is pushed up vertically using a digital force gage, and the peeling strength is measured.

On the other hand, the peeling strength between the surface of the resin layer 14 and the surface of the supporting substrate 12 is preferably 9.8N/25 mm or more, more preferably 14.7N/25 mm or more, particularly preferably 19.6N/25 mm or more. With the above-described peeling strength, when the glass substrate and the like are peeled from the resin layer, peeling between this supporting substrate and the resin layer does not occur easily, and the glass substrate and the like and the support (laminate of the supporting substrate and the resin layer) can be separated easily from the glass substrate laminate. As described above, by curing the curable silicone resin composition on the supporting substrate, this peeling strength can be attained easily. If the peeling strength between the surface of the resin layer 14 and the surface of the supporting substrate 12 is too high, when peeling of the supporting substrate and the resin layer becomes necessary for re-use of the supporting substrate and the like, there occurs a possibility of difficulty in its peeling. Therefore, the peeling strength between the surface of the resin layer 14 and the surface of the supporting substrate 12 is preferably 29.4N/25 mm or less.

The peeling strength between the surface of the resin layer 14 and the surface of the supporting substrate 12 is higher than the peeling strength between the surface of the resin layer 14 and the surface of the glass substrate 16 by preferably 10 N/25 mm or more, more preferably 15 N/25 mm or more.

<Method of Producing Glass Substrate Laminate>

Production of the glass substrate laminate is preferably carried out by a method of laminating the glass substrate on the surface of the resin layer 14 of the above-described support (lamination method). However, the production method of the glass substrate laminate is not limited to this lamination method, as described above. It is considered that, in the lamination method, the first main surface of the glass substrate and the peelable surface of the resin layer can be bound by force ascribable to van der Waals force between very adjacent opposing solid molecules, that is, close adhesion force. Therefore, in this case, the supporting substrate and the glass substrate can be kept in laminated state via the resin layer. A method of producing the glass substrate laminate by a method of lamination of the glass substrate on the surface of the resin layer of the above-described support will be explained below.

The method of laminating the glass substrate on the surface of the resin layer fixed to the supporting substrate is not particularly restricted, and can be carried out using known methods. Examples thereof include a non-contact pressure bonding method in which the glass substrate is laminated on the surface of the resin layer under a normal pressure environment, then, a press chamber is used, a method in which the resin layer and the glass substrate are pressure-bound using a roll or press, and other methods. It is preferable to carry out pressure bonding by a press chamber, roll, press and the like since the resin layer and the glass substrate are closely adhered by this means. Further, it is preferable to carry out pressure bonding by pressing with a gas, and by a roll or press, since bubbles incorporated between the resin layer and the glass substrate can be removed relatively easily. It is more preferable to carry out pressure bonding by a vacuum lamination method or vacuum press method since suppression of incorporation of bubbles and securement of excellent close adhesion can be attained more successfully. By carrying out pressure bonding under vacuum, there is also a merit that even if fine bubbles remain, bubbles do not grow by heating, scarcely leading to a deformation defect of the glass substrate.

In lamination of the support and the glass substrate, it is preferable to wash the surface of the glass substrate sufficiently, and to carry out lamination under an environment of high degree of cleanness. Even if extraneous materials are incorporated between the resin layer and the glass substrate, an influence is not exerted on the flatness of the surface of the glass substrate since the resin layer deforms, and the higher the degree of cleanness, its flatness is more excellent, thus, washing is preferable.

<Constituent Member of Panel for Display Device>

In the present invention, the constituent member 18 of a panel for a display device means members formed on the glass substrate or a part of them, in displays such as LCD, OLED and the like using the glass substrate. For example, in displays such as LCD, OLED and the like, members such as TFT arrays (hereinafter, referred to simply as "array"), protective layers, color filters, liquid crystals, transparent electrodes and the like made of ITO, various circuit patterns and the like, or a combination thereof, are formed on the surface of the glass substrate. For example, in displays composed of OLED, transparent electrodes, hole injection layers, hole transporting layers, light emitting layers, electron transporting layer and the like formed on the glass substrate are mentioned. The panel for a display device 40 composed of the glass substrate and the constituent member 18 is a glass substrate on which at least a part of the above-described members are formed. Therefore, for example, a glass substrate on which an array is formed and a glass substrate on which a transparent electrode is formed correspond to the panel for a display device 40.

<Support-Attached Panel for a Display Device>

The support-attached panel for a display device 10 is constituted of the supporting substrate 12, the resin layer 14, the glass substrate 16, and the constituent member 18 of a panel for a display device, in the illustrated example.

The support-attached panel for a display device 10 includes also, for example, an embodiment in which the array-formed surface of the support-attached panel for a display device in which an array is formed on the second main surface of the glass substrate and the color filter-formed surface of other support-attached panel for a display device in which a color filter is formed on the second main surface of the glass substrate are laminated via a sealing material and the like.

Further, from the support-attached panel for a display device 10 as described above, the panel for a display device 40 can be obtained. That is, from the support-attached panel for a display device 10, the panel for a display device 40 having the constituent member 18 of a panel for a display device and the glass substrate 16 can be obtained, by peeling the glass substrate 16 from the resin layer 14 fixed to the supporting substrate 12.

Further, from the panel for a display device as described above, a display device can be obtained. Examples of the display devices include LCD and OLED. As LCD, TN type, STN type, FE type, TFT type and MIM type may be mentioned.

<Method of Producing Support-Attached Panel for Display Device>

Although a method for producing the above-described support-attached panel for a display device is not particularly restricted, it is preferable that at least a part of constituent members of a panel for a display device are formed on the surface of the glass substrate of the above-described glass substrate laminate.

The method for forming at least a part of constituent members of a panel for a display device on the surface of the glass substrate of the glass substrate laminate is not particularly restricted, and conventionally known methods are carried out depending on the kind of the constituent member of the panel for a display device.

In an example of producing OLED, for forming an organic EL structure on the second main surface of the glass substrate of the glass substrate laminate, various layer formation operations and treatments are carried out, such as formation of a transparent electrode on the second main surface of the glass substrate, further, vapor-deposition of a hole injection layer, hole transporting layer, light emitting layer, electron transporting layer and the like on the transparent electrode-formed surface, formation of a rear surface electrode, sealing using a sealing plate, and the like. Examples of these layer formation operations and treatments include, specifically, a film formation treatment, a vapor deposition treatment, an adhesion treatment of a sealing plate, and the like. These constituent member formation operations may be a part of all constituent member formation operations necessary for a panel for a display device. In this case, the glass substrate on which a part of the constituent members are formed is peeled from the resin layer, then, the remaining constituent members are formed on the glass substrate, thereby producing a panel for a display device.

<Method of Producing Panel for Display Device>

After obtaining the above-described support-attached panel for a display device, further, the peelable surface of the resin layer can be peeled from the first main surface of the glass substrate in the support-attached panel for a display device, to obtain a panel for a display device. If the constituent members on the glass substrate in peeling are a part of all constituent members necessary for the panel for a display device, as described above, then, the remaining constituent members are formed on the glass substrate to produce a panel for a display device.

The method for peeling the first main surface of the glass substrate and the peelable surface of the resin layer is not particularly restricted. Specifically, for example, a sharp blade is inserted into an interface between the glass substrate and the resin layer, to give a trigger of peeling, and then, peeling can be carried out by blowing of a mixed fluid of water and compressed air. Preferably, a support-attached panel for a display device is set on a surface plate so that its supporting substrate faces upside and the panel faces downside, and the substrate on the panel side is sucked under vacuum onto the level block (in the case of lamination of supporting substrates on both surfaces, subjected to the operation sequentially), and under this condition, first, a blade is inserted into an interface of the glass substrate and the resin layer. Thereafter, the supporting substrate side is sucked with a plurality of vacuum suction pads, and the vacuum suction pads are allowed to rise sequentially from around the position of insertion of the blade. Then, an air layer is formed in an interface between the resin layer and the glass substrate on the panel side, and this air layer spreads into the whole area of the interface, thus, the supporting substrate can be peeled easily (in the case of lamination of supporting substrates on both surfaces of a support-attached panel for a display device, the above-described peeling process is repeated for each surface).

After obtaining the above-described panel for a display device, further, a display devise can be produced using the resultant panel for a display device. Here, the operation for obtaining a display devise is not particularly restricted, and for example, a display devise can be produced by conventionally known methods.

For example, in the case of production of TFT-LCD as a display device, the same steps as conventionally known various steps may be used such as a step of forming an array on a glass substrate, a step of forming a color filter on a glass substrate, a step of sticking the glass substrate on which an array is formed and the glass substrate on which a color filter is formed via a sealing material and the like (array-color filter sticking step), and the like. More specifically, examples of the treatments carried out in these steps include washing with pure water, drying, film formation, resist liquid application, exposure, development, etching and resist removal. Further, steps to be carried out after performing the array-color filter sticking step include a liquid crystal injection step, and a step of sealing the injection port to be carried out after performing the treatment, and treatments carried out in these steps.

EXAMPLES

Glass substrate laminates produced in examples shown below were subjected to evaluations of the following items.

[Evaluation of Re-Peelability]

Ten sets of glass substrate laminates were prepared, the second main surface of the glass substrate was sucked under vacuum onto a surface plate, then, a stainless blade having a thickness of 0.1 mm was inserted into an interface between the resin layer and the glass substrate on one corner part of the glass substrate laminate, giving a trigger of peeling of the first main surface of the glass substrate and the peelable surface of the resin layer. Then, the second main surface of the supporting substrate of the glass substrate laminate was sucked with a plurality of vacuum suction pads at a pitch of 90 mm, then, the suction pads were allowed to rise sequentially from the suction pad near the above-described corner part, thereby causing peeling between the first main surface of the glass substrate and the peelable surface of the resin layer. This treatment was repeated 10 times continuously for each of the prepared 10 sets of glass substrate laminates, and the number of the laminates succeeded in peeling without cracking of glass or breakage of the suction layer was evaluated.

[Evaluation of Heat Resistance]

A 50 mm square sample was cut from the glass substrate laminate, and this sample was placed on a hot plate heated at 300° C., and heated at a temperature rising rate of 10° C. per minute, and the temperature at which a foaming phenomenon was recognized in the sample was defined as the heat decomposition initiation temperature, and heat resistance was evaluated by the level of this temperature.

[Evaluation of Temporal Stability of Close Adhesion Strength]

For reproducing, in a short period of time, a hydrolysis phenomenon of hydrosilyl groups remaining in the resin, progressing under condition of leaving of the glass substrate laminate for a long period of time, the glass substrate laminate was exposed under high temperature and high humidity, thereafter, exposed to high temperature again, thus, durability (temporal stability) was evaluated.

Specifically, a sample of 25×75 mm square was cut from the glass substrate laminate, and a 25×25 mm square was cut only from the supporting substrate side of this sample, to obtain an evaluation sample. This evaluation sample was maintained for 20 hours in a constant temperature and constant humidity oven which had been kept at 80° C. and 95% relative humidity, then, further maintained for 4 hours in a constant temperature over which had been kept at 210° C. After cooling to ambient temperature, a non-sucked surface of the supporting substrate of the evaluation sample was fixed to the end of a table by a double-sided adhesive tape, and the center of the protruding thin glass substrate (25×25 mm) was pushed up vertically using a digital force gage, and the peeling mode and peeling strength were measured.

On the other hand, an evaluation sample was prepared separately, and the peeling mode and peeling strength were measured without carrying out the above-described test, and recorded as the initial values.

Synthesis Example 1

Synthesis of Organohydrogensiloxane A

A mixture of 5.4 g of 1,1,3,3-tetramethyldisiloxane, 96.2 g of tetramethylcyclotetrasiloxane and 118.6 g of octamethylcyclotetrasiloxane was cooled to 5° C., and 11.0 g of concentrated sulfuric acid was slowly added while stirring, then, further, 3.3 g of water was dropped over a period of 1 hour. The mixture was stirred for 8 hours while keeping the temperature at 10 to 20° C., then, toluene was added, and washing with water and separation of wasted acids were carried out until the siloxane layer became neutral. The neutral siloxane layer was concentrated by heating under reduced pressure thereby removing low boiling point fractions such as toluene and the like, to obtain an organohydrogensiloxane A of the following formula (6) in which k=40 and l=40.

[Chem. 5]

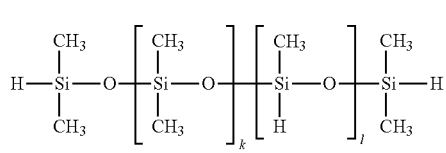

(6)

Synthesis Example 2

Synthesis of Organohydrogensiloxane B

An organohydrogensiloxane B of the above formula (6) in which k=100 and l=8 was obtained in the same manner as in Synthesis Example 1 excepting that 5.4 g of 1,1,3,3-tetramethyldisiloxane, 19.2 g of tetramethylcyclotetrasiloxane and 296.6 g of octamethylcyclotetrasiloxane were used as raw materials.

Comparative Synthesis Example 1

Synthesis of Organohydrogensiloxane C

An organohydrogensiloxane C of the following formula (7) in which a=0 and b=80 was obtained in the same manner as in Synthesis Example 1 excepting that 6.5 g of hexamethyldisiloxane and 192.4 g of tetramethylcyclotetrasiloxane were used as raw materials.

[Chem. 6]

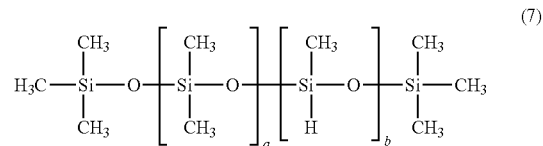

(7)

Synthesis Example 3

Synthesis of Alkenyl Group-Containing Siloxane D

To 3.7 g of 1,3-divinyl-1,1,3,3-tetramethyldisiloxane, 41.4 g of 1,3,5,7-tetramethyl-1,3,5,7-tetravinylcyclotetrasiloxane and 355.9 g of octamethylcyclotetrasiloxane were added a siliconate of potassium hydroxide in an amount of Si/K=20000/1 (molar ratio), and the mixture was allowed to cause an equilibrating reaction at 150° C. for 6 hours under a nitrogen atmosphere, then, ethylene chlorohydrin was added in an amount of 2 mol with respect to K, and neutralization thereof was performed at 120° C. for 2 hours. Thereafter, a bubbling treatment with heat was carried out at 160° C. for 6 hours under 666 Pa to cut volatile components, to obtain an alkenyl group-containing siloxane D in which the alkenyl equivalent number La per 100 g was 0.9 and Mw was 26000.

Synthesis Example 4

Synthesis of Alkenyl Group-Containing Siloxane E

An alkenyl group-containing siloxane E in which the alkenyl equivalent number La per 100 g was 0.002 and Mw was 91000 was obtained in the same manner as in Synthesis Example 3 excepting that 1.9 g of 1,3-divinyl-1,1,3,3-tetramethyldisiloxane and 889.8 g of octamethylcyclotetrasiloxane were used as raw materials.

Example 1

First, a polyimide resin sheet (Upirex AD sheet AD 110 manufactured by UBE Industries, Ltd.) having a length of 280 mm, a width of 280 mm, a plate thickness of 0.5 mm, a liner expansion coefficient of $480 \times 10^{-7}$/° C. and a 5% weight reduction temperature of 560° C. was prepared as a supporting substrate, and washed with pure water and washed with UV to clean its surface.

Next, the surface was activation-treated by a remote plasma method, then, the organohydrogensiloxane A and the alkenyl group-containing siloxane D were mixed so that the molar ratio (hydrogen atom/alkenyl group) of all hydrogen atoms bonded to a silicon atom to all alkenyl groups was 0.9, and 100 parts by weight of this siloxane mixture was mixed with 1 part by weight of a silicon compound having an acetylene type unsaturated group represented by the following formula (8), and a platinum catalyst was added so that the platinum metal concentration was 100 ppm, to obtain a curable silicone resin composition. This composition was coated on the first main surface of the supporting substrate by a screen printing method, at a size of a length of 278 mm and a width of 278 mm (coated amount: 15 g/m²). Further, the coated composition was cured with heat at 210° C. for 60 minutes in atmospheric air, thereby forming a cured silicone resin layer having a thickness of 15 μm, to obtain a support A. The silicone resin layer of the support A had a surface tension of 20.5N/m.

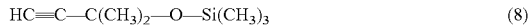

$$HC\equiv C-C(CH_3)_2-O-Si(CH_3)_3 \qquad (8)$$

The peelable surface of the cured silicone resin layer of the support A and the first main surface of a glass substrate having a thickness of 0.4 mm and having the same size as the cured silicone resin layer ("AN100" non-alkali glass plate having a linear expansion coefficient of $38\times10^{-7}$/° C.: manufactured by Asahi Glass Co., Ltd.) were laminated at room temperature so that the gravity centers of both substrates overlapped by a vacuum lamination apparatus, then, allowed to stand still in a pressure chamber at 0.49 MPa for 5 minutes, to obtain a glass substrate laminate A (glass substrate laminate of the present invention).

For the glass substrate laminate A, the above-described evaluation of re-peelability, evaluation of heat resistance and evaluation of temporal stability of close adhesion strength were carried out. Based on the results of the re-peelability test in which peeling progresses between the glass substrate and the cured silicone resin layer, it was recognized that the peeling strength between the glass substrate and the cured silicone resin layer was lower than the peeling strength between the supporting substrate and the cured silicone resin layer.

Re-peelability: 10/10 (all 10 sets were peelable)

Heat resistance (heat decomposition initiation temperature): 430° C.

Temporal stability of close adhesion strength: initial value=2.9N/25 mm, after acceleration=3.2N/25 mm Example 2

First, a glass plate ("AN 110" manufactured by Asahi Glass Co., Ltd.) having a length of 720 mm, a width of 600 mm, a plate thickness of 0.4 mm and a liner expansion coefficient of $38\times10^{-7}$/° C. was prepared as a supporting substrate, and washed with pure water and washed with UV to clean its surface.

Next, the organohydrogensiloxane B and the alkenyl group-containing siloxane D were mixed so that the molar ratio (hydrogen atom/alkenyl group) of all hydrogen atoms bonded to a silicon atom to all alkenyl groups was 0.9, further, this siloxane mixture and n-heptane were mixed at a weight ratio of 1/1, to obtain a solution of the siloxane mixture. Into 100 parts by weight of the siloxane mixture in the solution was mixed 1 part by weight of a silicon compound having an acetylene type unsaturated group represented by the following formula (8), and a platinum catalyst was added so that the platinum metal concentration was 100 ppm, to obtain a solution of a curable silicone resin composition of addition reaction type.

This composition was coated on the first main surface of the supporting substrate by a die coater, at a size of a length of 718 mm and a width of 598 mm (coated amount: 20 g/m²). Next, the coated composition was cured with heat at 210° C. for 60 minutes in atmospheric air, to obtain a support B having a cured silicone resin layer having a thickness of 15 μm. The cured silicone resin layer of the support B had a surface tension of 20.5N/m.

Next, a first main surface (surface at the side to be later contacted with the cured silicone resin layer) of a glass substrate ("AN 110" manufactured by Asahi Glass Co., Ltd.) having a length of 720 mm, a width of 600 mm, a plate thickness of 0.3 mm and a liner expansion coefficient of $38\times10^{-7}$/° C. was washed with pure water and washed with UV to clean the surface.

The peelable surface of the silicone resin layer on the first main surface of the supporting substrate and the first main surface of the glass substrate were laminated at room temperature so that the gravity centers of both substrates overlapped by a vacuum lamination apparatus, then, allowed to stand still in a pressure chamber at 0.49 MPa for minutes, to obtain a glass substrate laminate B (glass substrate laminate of the present invention).

In the glass substrate laminate B according to Example 2 as described above, the glass substrate and the supporting substrate were closely adhered to the cured silicone resin layer without generation of bubbles, and no convex defect was observed, and its smoothness was excellent.

Also for the glass substrate laminate B, the above-described evaluation of re-peelability, evaluation of heat resistance and evaluation of temporal stability of close adhesion strength were carried out. Based on the results of the re-peelability test in which peeling progresses between the glass substrate and the cured silicone resin layer, it was recognized that the peeling strength between the glass substrate and the cured silicone resin layer was lower than the peeling strength between the supporting substrate and the cured silicone resin layer.

Re-peelability: 10/10 (all 10 sets were peelable)

Heat resistance (heat decomposition initiation temperature): 440° C.

Temporal stability of close adhesion strength: initial value=3.9N/25 mm, after acceleration=4.0N/25 mm Example 3

First, a glass plate ("AN 110" manufactured by Asahi Glass Co., Ltd.) having a length of 720 mm, a width of 600 mm, a plate thickness of 0.6 mm and a liner expansion coefficient of $38\times10^{-7}$/° C. was prepared as a supporting substrate, and washed with pure water and washed with UV to clean its surface.

Next, the organohydrogensiloxane A as a resin for forming the resin layer and a 95 wt %/5 wt % mixture of the alkenyl group-containing siloxane D and the alkenyl group-containing siloxane E were mixed so that the molar ratio (hydrogen atom/alkenyl group) of all hydrogen atoms bonded to a silicon atom to all alkenyl groups was 0.9, and to 100 parts by weight of this siloxane mixture was mixed 1 part by weight of a silicon compound having an acetylene type unsaturated group represented by the above formula (8), and a platinum catalyst was added so that the platinum metal concentration was 100 ppm, to obtain a curable silicone resin composition of addition reaction type containing no solvent.

This composition was coated on the first main surface of the supporting substrate by a screen printing apparatus, at a size of a length of 718 mm and a width of 598 mm (coated amount: 20 g/m$^2$). Next, the coated composition was cured with heat at 180° C. for 60 minutes in atmospheric air, to obtain a support C having a cured silicone resin layer having a thickness of 20 μm. The cured silicone resin layer of the support C had a surface tension of 20.0N/m.

Next, a glass substrate ("AN 110" manufactured by Asahi Glass Co., Ltd.) having a length of 720 mm, a width of 600 mm, a plate thickness of 0.1 mm and a liner expansion coefficient of $38\times10^{-7}$/° C. was used as the glass substrate, and the peelable surface of the cured silicone resin layer on the first main surface of the supporting substrate and the first main surface of the glass substrate were laminated at room temperature so that the gravity centers of both substrates overlapped by a vacuum press, to obtain a glass substrate laminate C (glass substrate laminate of the present invention).

In the glass substrate laminate C according to Example 3 as described above, the glass substrate and the supporting substrate were closely adhered to the cured silicone resin layer without generation of bubbles, and no convex defect was observed, and its smoothness was excellent.

Also for the glass substrate laminate C, the above-described evaluation of re-peelability, evaluation of heat resistance and evaluation of temporal stability of close adhesion strength were carried out. Based on the results of the re-peelability test in which peeling progresses between the glass substrate and the cured silicone resin layer, it was recognized that the peeling strength between the glass substrate and the cured silicone resin layer was lower than the peeling strength between the supporting substrate and the cured silicone resin layer.

Re-peelability: 10/10 (all 10 sets were peelable)

Heat resistance (heat decomposition initiation temperature): 440° C.

Temporal stability of close adhesion strength: initial value=3.6N/25 mm, after acceleration=3.6N/25 mm Example 4

In this example, LCD is produced using the glass substrate laminate C obtained in Example 3.

Two glass substrate laminates C are prepared, and one of them is subjected to an array formation step, to form an array on the second main surface of the glass substrate. The remaining one of them is subjected to a color filter formation step, to form a color filter on the second main surface of the glass substrate.

The laminate C1 on which an array had been formed (support-attached panel for a display device of the present invention) and the laminate C2 on which a color filter had been formed (support-attached panel for a display device of the present invention) are stuck via a sealing material so that respective supporting substrates are positioned on the outsides, to obtain an empty cell of LCD with laminates on both sides.

Subsequently, the second main surface of the laminate C1 is sucked under vacuum onto a surface plate, and a stainless blade having a thickness of 0.1 mm is inserted into an interface between the resin layer and the glass substrate on a corner part of the laminate C2, giving a trigger of peeling of the first main surface of the glass substrate and the peelable surface of the resin layer. Then, the second main surface of the supporting substrate of the laminate C2 is sucked with 24 vacuum suction pads, then, the suction pads are allowed to rise sequentially from the suction pad near the above-described corner part of the laminate C2. As a result, the supporting substrate to which the resin layer is fixed can be peeled, leaving only an empty cell of LCD with the supporting substrate of the laminate C1 on the surface plate.

Next, the second main surface of the glass substrate having a color filter formed on the first main surface is sucked under vacuum onto a surface plate, and a stainless blade having a thickness of 0.1 mm is inserted into an interface between the resin layer and the glass substrate on a corner part of the laminate C1, giving a trigger of peeling of the first main surface of the glass substrate and the peelable surface of the resin layer. Then, the second main surface of the supporting substrate of the laminate C1 is sucked with 24 vacuum suction pads, then, the suction pads are allowed to rise sequentially from the suction pad near the above-described corner part of the laminate C1. As a result, the supporting substrate to which the resin layer is fixed can be peeled, leaving only an LCD cell on the level block. Thus, an empty cell of LCD constituted of a glass substrate having a thickness of 0.1 mm is obtained.

Subsequently, the empty cell of LCD is cut into 168 LCD empty cells having a length of 51 mm and a width of 38 mm, then, a liquid crystal injection step and a step of sealing the injection port are carried out to complete LCD cells. A step of sticking a polarization plate to the completed LCD cell is performed, subsequently, a module formation step is performed to obtain LCD. Thus obtainable LCD causes no problem on properties.

Example 5

In this example, LCD is produced using the glass substrate laminate B obtained in Example 2.

Two glass substrate laminates C are prepared, and one of them is subjected to an array formation step, to form an array on the second main surface of the glass substrate. The remaining one of them is subjected to a color filter formation step, to form a color filter on the second main surface of the glass substrate.

The laminate B1 on which an array is formed (support-attached panel for a display device of the present invention) and the laminate B2 on which a color filter is formed (support-attached panel for a display device of the present invention) are stuck via a sealing material so that respective supporting substrates are positioned on the outsides, to obtain an LCD cell with laminates on both sides. Thereafter, peeling is caused between the peelable surface of the resin layer and the first main surface of each glass substrate in the same procedure as in Example 4.

Thus, an empty cell of LCD constituted of a glass substrate having a thickness of 0.3 mm is obtained.

Subsequently, the thickness of each glass substrate is adjusted to 0.15 mm by a chemical etching treatment. Generation of optically problematical etchpits is not observed on the surface of the glass substrate after the chemical etching treatment.

Subsequently, the empty cell of LCD is cut into 168 LCD empty cells having a length of 51 mm and a width of 38 mm, then, a liquid crystal injection step and a step of sealing the injection port are carried out to complete LCD cells. A step of sticking a polarization plate to the formed LCD cell is performed, subsequently, a module formation step is performed to obtain LCD. Thus obtainable LCD causes no problem on properties.

Example 6

In this example, OLED is produced using the glass substrate laminate C obtained in Example 3.

A step of forming a transparent electrode, a step of forming a supporting electrode, a step of vapor-deposing a hole injection layer, hole transporting layer, light emitting layer, electron transporting layer and the like, and a step of sealing them are carried out to form an organic EL structure on the thin glass substrate of the laminate C3 (support-attached panel for a display device of the present invention).

Subsequently, the sealed side is sucked under vacuum onto a surface plate, and a stainless blade having a thickness of 0.1 mm is inserted into an interface between the resin layer and the glass substrate on a corner part of the laminate C3, giving a trigger of peeling of the first main surface of the glass substrate and the peelable surface of the resin layer. Then, the second main surface of the supporting substrate of the laminate is sucked with 24 vacuum suction pads, then, the suction pads are allowed to rise sequentially from the suction pad near the above-described corner part of the laminate C3. As a result, the supporting substrate to which the resin layer is fixed can be peeled, leaving only the glass substrate carrying thereon the formed organic EL structure on the surface plate.

Subsequently, the glass substrate is cut, using a laser cutter or scribe-break method, into 288 cells having a length of 41 mm and a width of 30 mm, then, the glass substrate carrying thereon the formed organic EL structure, and an opposite substrate are fabricated, and a module formation step is performed, to produce OLED. Thus obtainable OLED causes no problem on properties.

Comparative Example 1

The organohydrogensiloxane C and the alkenyl group-containing siloxane D were mixed so that the molar ratio (hydrogen atom/alkenyl group) of all hydrogen atoms bonded to a silicon atom to all alkenyl groups was 0.9, further, this siloxane mixture and n-heptane were mixed at a weight ratio of 1/1, to obtain a solution of the siloxane mixture. To 100 parts by weight of the siloxane mixture in the solution was mixed 1 part by weight of a silicon compound having an acetylene type unsaturated group represented by the above formula (8), and a platinum catalyst was added so that the platinum metal concentration was 100 ppm, to obtain a solution of a curable silicone resin composition of addition reaction type. A laminate D was prepared in the same manner as in Example 3 excepting that this solution was used.

Using the resultant laminate D, the above-described evaluation of re-peelability, evaluation of heat resistance and evaluation of temporal stability of close adhesion strength were carried out.

Re-peelability: 10/10 (all 10 sets were peelable)

Heat resistance (heat decomposition initiation temperature): 390° C.

Temporal stability of close adhesion strength: initial value=3.4N/25 mm, after acceleration=8.8N/25 mm (breakage was observed partially on the resin layer)

While the invention has been described in detail with reference to specific embodiments thereof, it will be apparent to one skilled in the art that various changes and modifications can be made therein without departing from the spirit and scope thereof.

Incidentally, the present application is based on Japanese Patent Application No. 2009-198761 filed on Aug. 28, 2009, and the contents are incorporated herein by reference.

Also, all the references cited herein are incorporated as a whole.

INDUSTRIAL APPLICABILITY

The present invention is capable of providing a support for supporting a glass substrate, which is excellent in heat resistance, in which temporal increase in peeling strength between the support and a glass substrate to be laminated is suppressed, further on which the laminated glass substrate can be peeled without breakage in a short period of time, and which can be applied also for production processes under high temperature condition such as production of a TFT array, and the like, and a method for producing the support. Further, the present invention is also capable of providing a glass substrate laminate obtained by using the support; a method for producing the glass substrate laminate, a panel for a display device with the support, for producing a panel for a display device, obtained by using the glass substrate laminate; and a method for producing a panel for a display device using the glass substrate laminate.

DESCRIPTION OF REFERENCE NUMERALS AND SIGNS

10: support-attached panel for a display device
12: supporting substrate
14: resin layer
16: glass substrate
18: constituent member of panel for a display device
20: support
30: glass substrate laminate
40: panel for a display device

The invention claimed is:

1. A support comprising a supporting substrate and a cured silicone resin layer having a peelable surface and being disposed on one surface of the supporting substrate, for laminating a glass substrate on a surface of the cured silicone resin layer,
   wherein a cured silicone resin of said cured silicone resin layer is a cured material of a curable silicone resin composition containing the following linear organopolysiloxane (a) and the following linear organopolysiloxane (b), and
   said cured silicone resin layer is a cured silicone resin layer formed by curing said curable silicone resin composition on a surface of said supporting substrate:
      Linear organopolysiloxane (a): linear organopolysiloxane having at least two alkenyl groups per one molecule thereof;
      Linear organopolysiloxane (b): linear organopolysiloxane having at least three hydrogen atoms bonded to a silicon atom per one molecule thereof, in which at least one of said hydrogen atoms bonds to a silicon atom at an end of the molecule.

2. The support according to claim 1, wherein a molar ratio (hydrogen atom/alkenyl group) of all hydrogen atoms bonded to a silicon atom with respect to all alkenyl groups in said curing silicone resin composition is 0.7 to 1.05.

3. The support according to claim 1, wherein a material of the supporting substrate has a 5% heat weight reduction temperature of 300° C. or more.

4. The support according to claim 1, wherein the supporting substrate is a glass plate, silicon wafer, synthetic resin plate or metal plate.

5. A method for producing a glass substrate laminate, comprising laminating a glass substrate on the surface of the cured silicone resin layer of the support according to claim 1.

6. The method for producing a glass substrate laminate according to claim 5, wherein the glass substrate has a thickness of 0.05 to 0.4 mm.

7. A method for producing a support having a supporting substrate and a cured silicone resin layer having a peelable surface and being disposed on one surface of the supporting substrate, for laminating a glass substrate on a surface of the cured silicone resin layer, said method comprising:
  applying a curable silicone resin composition containing the following linear organopolysiloxane (a) and the following linear organopolysiloxane (b) on one surface of the supporting substrate to form a layer of the curable silicone resin composition;
  followed by curing said curable silicone resin composition to form said cured silicone resin layer:
    Linear organopolysiloxane (a): linear organopolysiloxane having at least two alkenyl groups per one molecule thereof;
    Linear organopolysiloxane (b): linear organopolysiloxane having at least three hydrogen atoms bonded to a silicon atom per one molecule thereof, in which at least one of said hydrogen atoms bonds to a silicon atom at an end of the molecule.

8. A glass substrate laminate having a supporting substrate, a glass substrate and a cured silicone resin layer disposed therebetween,
  wherein said cured silicone resin layer comprises a cured material of a curable silicone resin composition containing the following linear organopolysiloxane (a) and the following linear organopolysiloxane (b), and a peeling strength between the glass substrate and the cured silicone resin layer is smaller than a peeling strength between the supporting substrate and the cured silicone resin layer:
    Linear organopolysiloxane (a): linear organopolysiloxane having at least two alkenyl groups per one molecule thereof;
    Linear organopolysiloxane (b): linear organopolysiloxane having at least three hydrogen atoms bonded to a silicon atom per one molecule thereof, in which at least one of said hydrogen atoms bonds to a silicon atom at an end of the molecule.

9. The glass substrate laminate according to claim 8, wherein said cured silicone resin layer is a layer formed by curing said curable silicone resin composition under the condition of contacting with a surface of the supporting substrate and no-contacting with a surface of the glass substrate, and, after curing the curable silicone resin composition, allowing said composition to contact with the surface of the glass substrate.

10. The glass substrate laminate according to claim 8, wherein a molar ratio (hydrogen atom/alkenyl group) of all hydrogen atoms bonded to a silicon atom with respect to all alkenyl groups in said curable silicone resin composition is 0.7 to 1.05.

11. The glass substrate laminate according to claim 8, wherein a material of the supporting substrate has a 5% heat weight reduction temperature of 300° C. or more.

12. The glass substrate laminate according to claim 8, wherein the supporting substrate is a glass plate, silicon wafer, synthetic resin plate or metal plate.

13. The glass substrate laminate according to claim 8, wherein the glass substrate has a thickness of 0.05 to 0.4 mm.

14. A support-attached panel for a display device, for producing a panel for a display device, obtained by forming at least a part of constituent members of a panel for a display device on the surface of the glass substrate of the glass substrate laminate according to claim 8.

15. A method for producing a panel having a glass substrate for a display device, said method comprising:
  forming at least a part of constituent members of a panel for a display device on the surface of the glass substrate of the glass substrate laminate according to claim 8,
  followed by separating the glass substrate from the supporting substrate and the cured silicone resin layer.

* * * * *